(12) United States Patent
Smith et al.

(10) Patent No.: US 8,401,691 B2
(45) Date of Patent: Mar. 19, 2013

(54) DYNAMIC METROLOGY METHODS AND SYSTEMS

(75) Inventors: Kevin Scott Smith, Huntersville, NC (US); Robert J. Hocken, Concord, NC (US)

(73) Assignee: University of North Carolina at Charlotte, Charlotte, NC (US)

( * ) Notice: Subject to any disclaimer, the term of this patent is extended or adjusted under 35 U.S.C. 154(b) by 291 days.

(21) Appl. No.: 12/933,737

(22) PCT Filed: Apr. 27, 2009

(86) PCT No.: PCT/US2009/041777
§ 371 (c)(1),
(2), (4) Date: Sep. 21, 2010

(87) PCT Pub. No.: WO2009/134708
PCT Pub. Date: Nov. 5, 2009

(65) Prior Publication Data
US 2011/0022220 A1    Jan. 27, 2011

Related U.S. Application Data

(60) Provisional application No. 61/048,372, filed on Apr. 28, 2008.

(51) Int. Cl.
*G06F 19/00*       (2011.01)

(52) U.S. Cl. .................. 700/170; 700/192; 700/193
(58) Field of Classification Search .................. 700/170, 700/192, 193
See application file for complete search history.

(56) References Cited

U.S. PATENT DOCUMENTS

| | | | |
|---|---|---|---|
| 6,959,484 B1 * | 11/2005 | Spangler et al. | 29/709 |
| 2004/0093119 A1 * | 5/2004 | Gunnarsson et al. | 700/245 |
| 2004/0193385 A1 | 9/2004 | Yutkowitz | |
| 2005/0102118 A1 | 5/2005 | Grupp et al. | |
| 2006/0091330 A1 | 5/2006 | Van Bilsen et al. | |
| 2007/0051179 A1 | 3/2007 | McMurtry et al. | |
| 2008/0033680 A1 | 2/2008 | Grupp | |

* cited by examiner

*Primary Examiner* — Michael D Masinick
(74) *Attorney, Agent, or Firm* — Clements Bernard PLLC; Christopher L. Bernard; Lawrence A. Baratta, Jr.

(57) ABSTRACT

The present invention provides dynamic metrology methods and systems for: periodically determining an actual position of one or more of a machine and a tool with respect to a workpiece using one or more laser interferometers; tracking a tracked position of the one or more of the machine and the tool with respect to the workpiece using one or more accelerometers; and altering a controlled position of the one or more of the machine and the tool with respect to the workpiece when either the actual position or the tracked position of the one or more of the machine and the tool with respect to the workpiece diverges from a desired position of one or more of the machine and the tool with respect to the workpiece.

19 Claims, 3 Drawing Sheets

DYNAMIC METROLOGY METHODS AND SYSTEMS

CROSS-REFERENCE TO RELATED APPLICATION(S)

The present non-provisional patent application claims the benefit of priority of U.S. Provisional Patent Application No. 61/048,372, filed on Apr. 28, 2008, and entitled "DYNAMIC METROLOGY OF LARGE MACHINE TOOLS," the contents of which are incorporated in full by reference herein.

FIELD OF THE INVENTION

The present invention relates generally to dynamic metrology methods and systems. More specifically, the present invention relates to dynamic metrology methods and systems that utilize and incorporate, in sequence or parallel, devices for determining the position of a machine or tool with respect to a workpiece during quasistatic and typical machining motions and devices for determining the position of the machine or tool with respect to the workpiece during actual machining motions. Thus, quasistatic and dynamic errors may be rapidly measured and accounted for, thereby allowing for the precise and accurate machining or forming of parts and other components, such as monolithic components, both large and small, for example.

BACKGROUND OF THE INVENTION

There is a considerable (and growing) need in the aerospace and other industries for higher precision and accuracy machine tools than those that are currently being used in production shops. Higher precision and accuracy machine tools enable new manufacturing technologies, such as by eliminating mate-drilling during assembly operations by producing full-size fastener holes during fabrication, etc. Higher precision and accuracy machine tools would also eliminate the need to measure, cut, and fit shims for assembled parts with critical interfaces. The cost for the conventional assembly practices involving measuring and fitting may be substantial—0.5% to 1% of the cost of an aircraft. Thus, the savings related to assembly operations alone of higher precision and accuracy machine tools could save the aerospace industry more than $1 million per aircraft. Additional savings could be realized in the procurement costs for new machines if the higher precision and accuracy could be achieved through software correction, rather than through days, weeks, or months of manual alignment and adjustment of the machine during installation and periodic calibration.

The precision and accuracy of machine tools depends on many factors. A common taxonomy divides machine tool errors into two categories: quasistatic and dynamic. Quasistatic machine tool errors vary slowly with time or the position of the machine. Kinematic machine tool errors arise from the fact that the machine axes are not perfectly square, that the axes are not perfectly straight, that the driving mechanisms are not perfectly made, that the machine was not perfectly assembled, and so on. Load-induced machine tool errors include distortions of the machine due to static or nearly-static forces. An example is the sag of a ram as it extends under the influence of gravity. Thermally-induced geometric machine tool errors (common in most manufacturing environments) include the changes in the dimensions and alignment of the machine due to changes in environmental temperature, and in response to heat sources on the machine, such as the spindle. All of these errors may be measured using traditional equipment, such as laser interferometers, electronic levels, straight edges, and so on. Although the thermal errors are typically slowly changing, it is difficult to arrange a "typical" thermal state of the machine in which to measure the errors, and it is even more difficult to maintain that thermal state during the time required to measure. Dynamic machine tool errors result from the fact that the machine is not moving in a quasistatic way during its normal operation. Rounding or overshoots in corners and following errors as the machine moves on a path involving multiple axes are examples of these errors. These errors are not seen using traditional geometric error measurement techniques because they only appear when the feeds are larger. Spindle error motions are only seen when the spindle is rotating. They include spindle runout and spindle axis precession. Devices are commercially available to measure these errors. Vibrations are periodic motions in the machine, and are, therefore, by definition dynamic. The source of the energy for the motion may be rotating unbalances, the interrupted nature of the cutting operation, and chatter. These errors are completely missed using traditional quasistatic error measurement techniques. Workpiece and tooling errors include chucking and fixturing, tool wear, and material stability.

In attempts to quantify machine tool errors, and to improve the precision and accuracy of manufactured parts, measurements of machine tool operations have been made for decades. In the past few decades, a number of national and international standards have been developed. Most important among these are, in the United States, the ASME B5.54 and B5.57 standards, and, in Europe, the VDI/VDE 3441 and ISO 230 standards. Even in the most modern of these standards, the B5 and ISO series, positioning precision and accuracy are still measured quasistatically. That is, the machine is stepped in linear fashion along each of its linear axes (or in a rotary fashion along each of it rotary axes) and stopped at preset positions. Laser interferometry is used to measure the displacements of the linear axes and either an autocollimator, or a differential angle interferometer combined with an indexing table, are used to measure the displacements of the rotary axes. The dynamic behavior of the machine is typically assessed separately by measuring spindle error motions and contouring accuracy using a telescoping ball bar or its equivalent (for example, a disk check is used in Europe and an encoder that measures positioning in a plane is available).

Clearly, the existing state of the art is inadequate, and becoming more so every day. The existing measurement procedures are very time consuming, such that even making the measurements is expensive. Correction for the quasistatic machine tool errors, while possible (and common in coordinate measuring machines (CMMs)) is rarely performed in a manufacturing environment. Even worse, machining is a dynamic process, and none of the dynamic machine tool errors are measured using current technology. This is further compounded by the changing thermal state of the machine resulting from the varying demand on the spindle and axis drives (i.e. the heat sources in the machine), which are heavily dependent on the part being manufactured. The limitations of the existing measurement techniques are becoming more obvious as the axis speeds and accelerations of machine tools continue to increase. Even for relatively large machines, accelerations are now on the order of 0.5 g to 1 g, and the feed motions are on the order of 40 m/min.

In a yet more demanding requirement, for multi-axis machine tools, the position of the tool with respect to the workpiece must be measured with multiple or all axes in simultaneous movement. Some research has been done into real-time measurement using techniques other than ball bars (which are inherently two-dimensional), but this work has typically been limited to selected straight lines within the workspace because of the limitations of the laser instrumentation. Therefore, at this time, there is a large and growing need for real-time measurement of the performance of multi-axis machines at typical operational feeds and speeds on trajectories that are representative of actual parts. Such measurements, however, are of limited value if they cannot be made quickly to allow for the rapid calibration (and compensation) of the errors discovered. Even more benefit would come from an ability to measure and correct for these errors during machining, providing the ability to take into account the changing thermal and dynamic conditions of the machine.

There are a limited number of three-axis machine tools, and no five-axis machine tools, that have the capability for real-time dynamic calibration and compensation. However, in the past decade or so, there have been technological advances in other fields that may enable new methods and systems for machine tool measurement and compensation. One of the most obvious technological advances is the increase in computational power, combined with increased sampling and data processing capabilities. This opens the door for the real-time measurement of multiple sensors at high data acquisition rates, suitable for data collection at axis speeds consistent with realistic machining operations. Laser measurement technologies have also advanced, allowing greater speed and performance in laser devices, making them suitable as "tracking" devices. Finally, the development of micro-electromechanical systems (MEMS) have led to new classes of very high-performance, relatively low-cost accelerometers, that have low noise and bandwidths down to direct current (DC).

In general, the technology of the present invention takes advantage of the most promising of the above technologies and applies them to the dynamic measurement of multi-axis machine tools. The new hardware and software enables the development of compensation information in a short period of time (i.e. hours, not days, weeks, or months), and the ability to observe the dynamic errors, which the conventional quasistatic methods and systems cannot measure. This research has a direct benefit in defense manufacturing, for example, by dramatically reducing the cost of manufactured parts, through a reduction in set-up and alignment costs for machines, and through an increase in the precision and accuracy of manufactured parts. This is especially true for part families that require large, multi-axis machine tools.

Again, there is a considerable (and growing) need in the aerospace and other industries for higher precision and accuracy machine tools than those that are currently being used in production shops. Higher precision and accuracy machine tools enable new manufacturing technologies, such as by eliminating mate-drilling during assembly operations by producing full-size fastener holes during fabrication, etc. Higher precision and accuracy machine tools would also eliminate the need to measure, cut, and fit shims for assembled parts with critical interfaces. The cost for the conventional assembly practices involving measuring and fitting may be substantial—0.5% to 1% of the cost of an aircraft. Thus, the savings related to assembly operations alone of higher precision and accuracy machine tools could save the aerospace industry more than $1 million per aircraft. Additional savings could be realized in the procurement costs for new machines if the higher precision and accuracy could be achieved through software correction, rather than through days, weeks, or months of manual alignment and adjustment of the machine during installation and periodic calibration. This is an undesirable and costly solution that can directly impact new aircraft delivery schedules because of the long procurement time and high costs for new machines. Additionally, the process must be frequently repeated to ensure that the machine calibration remains correct.

Volumetric calibration and compensation is sometimes seen as a solution to reduce the build-time for machines, and to improve the positional accuracy for the production of high precision and accuracy components. However, full volumetric calibration and compensation of multi-axis machines (i.e. four or more axes, with at least one rotary axis, for example) is still not common among aerospace suppliers or the like. The main reasons for this are that current methods of calibration and compensation do not identify all of the geometric and motion errors of an arbitrary machine, many of which significantly impact the volumetric accuracy of the machine—in particular, the non-quasistatic errors are missed; they require expert setup and the use of multiple metrology systems; and they may require a week or more of non-productive machine down time.

The result is that many aerospace suppliers and the like simply do not calibrate their machines. The demand for reliable high precision and accuracy machine tool capability is passed to the machine builder, who must then spend weeks (and sometimes months) trying to build precision and accuracy in, instead of rapidly deploying the machine and then calibrating it. The associated costs appear in the final products of the machines. If instead the capability of volumetric calibration and compensation of machine tools may be improved to provide a faster and more complete error measurement, and to correct for those measured errors, it would open the door for significant cost savings.

BRIEF SUMMARY OF THE INVENTION

In various exemplary embodiments, the present invention provides dynamic metrology methods and systems that utilize and incorporate, in sequence or parallel, devices for determining the position of a machine or tool with respect to a workpiece during quasistatic and typical machining motions, such as a set of laser interferometers or the like (optionally mounted on equipment adjacent to the machine or tool, or on the workpiece), and devices for determining the position of the machine or tool with respect to the workpiece during actual machining motions, such as a set of MEMS accelerometers or the like (optionally mounted on the machine or tool). Thus, quasistatic and dynamic errors may be rapidly measured and accounted for, thereby allowing for the precise and accurate machining or forming of parts and other components, such as monolithic components, both large and small, for example. In this manner, geometric errors like straightness and squareness may be captured, as well as those resulting from the controller, for example, and from the changing environmental state of the machine and/or tool and their surroundings. Hardware and software associated or in communication with the controller is then used to compensate for these errors. The dynamic metrology methods and systems of the present invention are of particular use to both the manufacturers and users of machine tools and the like.

In one exemplary embodiment, the present invention provides a dynamic metrology method, including: periodically determining an actual position of one or more of a machine and a tool with respect to a workpiece; tracking a tracked position of the one or more of the machine and the tool with respect to the workpiece; and altering a controlled position of the one or more of the machine and the tool with respect to the workpiece when either the actual position or the tracked position of the one or more of the machine and the tool with respect to the workpiece diverges from a desired position of one or more of the machine and the tool with respect to the workpiece. Periodically determining the actual position of the one or more of the machine and the tool with respect to the workpiece includes periodically determining the actual position of the one or more of the machine and the tool with respect to the workpiece using one or more laser interferometers. Optionally, the one or more laser interferometers are mounted one or more of adjacent to the one or more of the machine and the tool and on the workpiece. Tracking the tracked position of the one or more of the machine and the tool with respect to the workpiece includes tracking the tracked position of the one or more of the machine and the tool with respect to the workpiece using one or more accelerometers. Optionally, the one or more accelerometers are mounted on one or more of the one or more of the machine and the tool. Optionally, the actual position of the one or more of the machine and the tool with respect to the workpiece is periodically determined for a region of the workpiece. Optionally, the tracked position of the one or more of the machine and the tool with respect to the workpiece is tracked within the region of the workpiece.

In another exemplary embodiment, the present invention provides a dynamic metrology system, including: one or more laser interferometers for periodically determining an actual position of one or more of a machine and a tool with respect to a workpiece; one or more accelerometers for tracking a tracked position of the one or more of the machine and the tool with respect to the workpiece; and a controller for altering a controlled position of the one or more of the machine and the tool with respect to the workpiece when either the actual position or the tracked position of the one or more of the machine and the tool with respect to the workpiece diverges from a desired position of one or more of the machine and the tool with respect to the workpiece. Optionally, the one or more laser interferometers are mounted one or more of adjacent to the one or more of the machine and the tool and on the workpiece. Optionally, the one or more accelerometers are mounted on one or more of the one or more of the machine and the tool. Optionally, the actual position of the one or more of the machine and the tool with respect to the workpiece is periodically determined for a region of the workpiece. Optionally, the tracked position of the one or more of the machine and the tool with respect to the workpiece is tracked within the region of the workpiece.

In a further exemplary embodiment, the present invention provides a component formed by the dynamic metrology method, including: periodically determining an actual position of one or more of a machine and a tool with respect to a workpiece; tracking a tracked position of the one or more of the machine and the tool with respect to the workpiece; and altering a controlled position of the one or more of the machine and the tool with respect to the workpiece when either the actual position or the tracked position of the one or more of the machine and the tool with respect to the workpiece diverges from a desired position of one or more of the machine and the tool with respect to the workpiece. Periodically determining the actual position of the one or more of the machine and the tool with respect to the workpiece includes periodically determining the actual position of the one or more of the machine and the tool with respect to the workpiece using one or more laser interferometers. Optionally, the one or more laser interferometers are mounted one or more of adjacent to the one or more of the machine and the tool and on the workpiece. Tracking the tracked position of the one or more of the machine and the tool with respect to the workpiece includes tracking the tracked position of the one or more of the machine and the tool with respect to the workpiece using one or more accelerometers. Optionally, the one or more accelerometers are mounted on one or more of the one or more of the machine and the tool. Optionally, the actual position of the one or more of the machine and the tool with respect to the workpiece is periodically determined for a region of the workpiece. Optionally, the tracked position of the one or more of the machine and the tool with respect to the workpiece is tracked within the region of the workpiece.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

Figure 1:
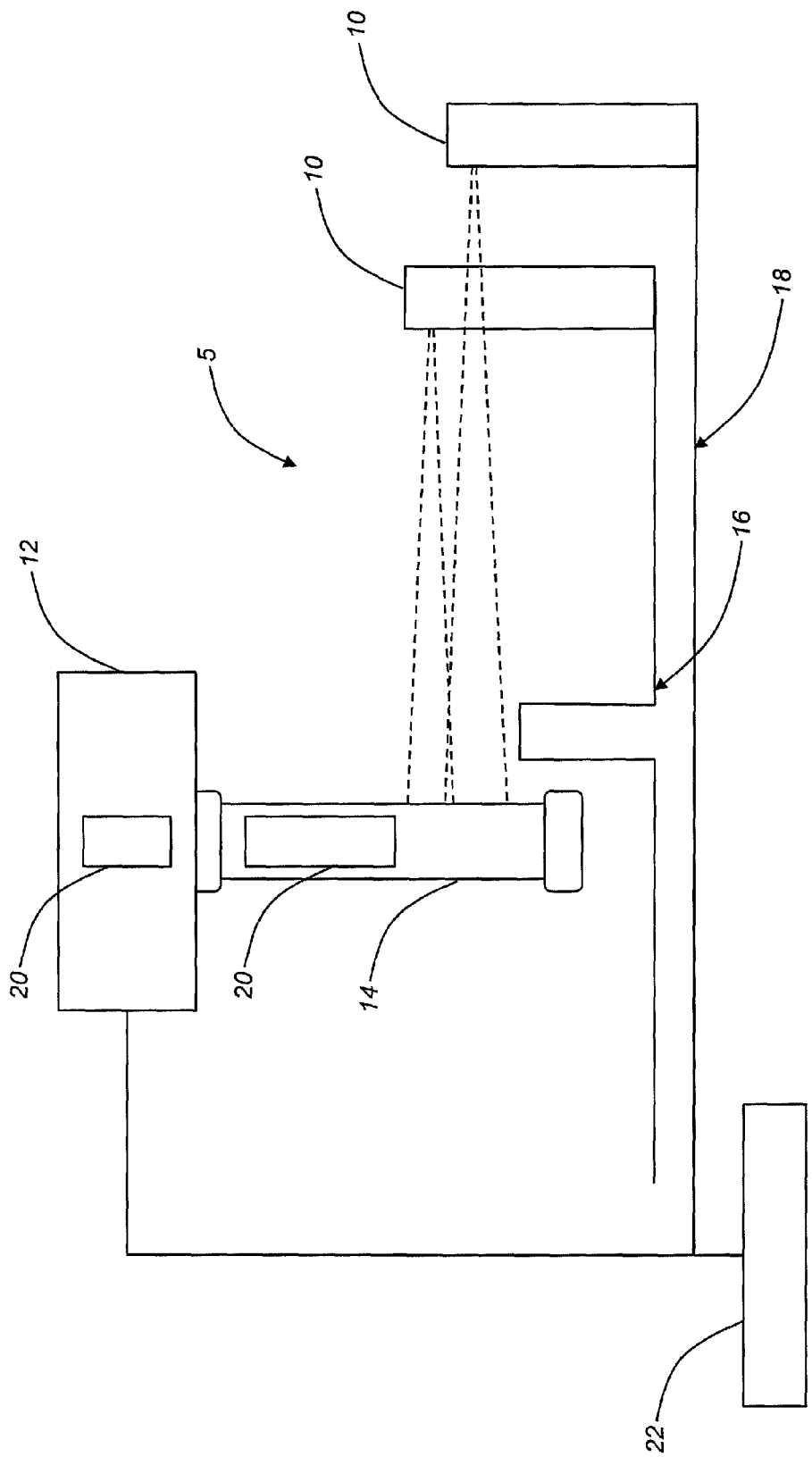
FIG. 1 is a schematic diagram illustrating one exemplary embodiment of the dynamic metrology system of the present invention.

Referring to FIG. 1, in one exemplary embodiment, the present invention provides dynamic metrology methods and systems 5 that utilize and incorporate, in sequence or parallel, devices 10 for determining the position of a machine 12 or tool 14 with respect to a workpiece 16 during quasistatic and typical machining motions, such as a set of laser interferometers or the like (optionally mounted on equipment 18 adjacent to the machine 12 or tool 14, or on the workpiece 16), and devices 20 for determining the position of the machine 12 or tool 14 with respect to the workpiece 16 during actual machining motions, such as a set of MEMS accelerometers or the like (optionally mounted on the machine 12 or tool 14). Thus, quasistatic and dynamic errors may be rapidly measured and accounted for, thereby allowing for the precise and accurate machining or forming of parts and other components, such as monolithic components, both large and small, for example. In this manner, geometric errors like straightness and squareness may be captured, as well as those resulting from the controller 22, for example, and from the changing environmental state of the machine 12 and/or tool 14 and their surroundings. Hardware and software associated or in communication with the controller 22 is then used to compensate for these errors. The dynamic metrology methods and systems 5 of the present invention are of particular use to both the manufacturers and users of machine tools and the like.

In this exemplary embodiment, the present invention couples the promising aspects of and advances in the areas of computational power, laser measurement technology, and MEMS to develop new methodologies for the dynamic measurement of the precision and accuracy of multi-axis machine tools and the like. The creation and development of practical equipment and techniques to address the very real metrology and machining errors caused by the previously unmeasured and/or uncompensated for dynamic errors are of clear importance to the successful manufacture of complex parts and components needed for aerospace and other applications.

The technical challenges associated with the dynamic measurement of machine tool errors are addressed using two different approaches. First, a set of laser trackers 10 (e.g. three laser trackers) is/are used to directly measure the position of the machine 12 or tool 14 (e.g. the spindle) with respect to a fixed frame of reference. These laser trackers 10, and their measurement beams, form a tetrahedron or the like, and the position of the spindle with respect to the mounted laser trackers 10 is computed by trilateration or the like. Second, the position of the spindle is deduced with respect to the table 18 by integrating signals from MEMS accelerometers 20 mounted on each, for example. The measured acceleration in three perpendicular coordinate directions is integrated into velocity, and integrated again into displacement. The laser tracker approach has the advantage of using proven technology, but requires that the laser trackers 10 have a direct line of sight to the retroreflector. In addition, the laser trackers 10 may be too expensive to be left permanently mounted on or adjacent to most machines 12. The accelerometer integration approach has the advantages of low cost, of not requiring a direct line of sight, and of being insensitive to the presence of coolant and chips. Accelerometer integration has the disadvantage of being sensitive to noise in the acceleration measurement. In alternative exemplary embodiments, these two approaches are used independently, sequentially, or simultaneously to derive the best possible dynamic error measurements.

Single-beam laser trackers were developed over twenty-five years ago and have been used quite reliably throughout the aerospace industry for assembly applications. However, their applicability to the measurement of machine tool errors has been limited because of the following error in the instrument while tracking a target. This problem was recognized many years ago and a four-beam laser interferometer ranging system was developed for the measurement of large mirrors; however, this system was too slow for machine tool accuracy measurement. In recent years, new single-beam laser trackers have been developed which are suitable for machine tool measurements. The specifications of an acceptable exemplary laser tracker 10 are provided in Table 1.

TABLE 1

Exemplary Laser Tracker Specifications

| | |
|---|---|
| Maximum Lateral Target Speed | >3.0 m/sec (120 degrees/sec) |
| Maximum Acceleration All Directions | >2 g |
| Horizontal Range | 640 degrees (±320 degrees) |
| Vertical Range | +80 degrees to −60 degrees |
| Measuring Ø (IFM and ADM) | >120 m (400 ft) |
| Angle Resolution | ±0.07 arc-sec |
| Internal Level Accuracy | ±2 arc-sec |
| Resolution | 1 μm |
| Repeatability | 2.5 ppm (2sigma) |
| Data Sampling Rate | 2000 points/sec |
| Air Temperature | −10 degrees C. to >40 degrees C. (14 degrees F. to >104 degrees F.) |

It should be noted that the laser tracker 10 may handle accelerations up to 2 g, and lateral target speeds of 3 m/sec (180 m/min), which is more than enough for the desired measurements. Three laser trackers 10 may be mounted on a reference surface or on the table 18 of a large machine tool, for example, and may be used to follow or track retroreflectors mounted at or near the spindle as the machine 12 moves through its workspace. The three laser trackers 10 form the base of a tetrahedron, for example, and the triangles created by their measurement beams form the three remaining sides of the tetrahedron, for example. Using the measured lengths of the sides, the position of the retroreflectors may be determined by trilateration or the like. The machine 12 may be moved throughout the workspace at speeds that are typical for real machining operations, and the errors may be measured at each location.

In order to track the machine 12 in an active cutting mode, a system which is more robust in the presence of coolant and chips is provided, and one which does not require a clear line of sight to the tool 14 (it should be noted that "machine" 12 and "tool" 14 are often used interchangeably herein). Accelerometers 20 are mounted on the spindle housing and/or in the table 18. The relative motion between the sets of accelerometers 20 is deduced by integrating the acceleration signals into velocity, and then again into displacement for all degrees of freedom. An error map of the machine may then be determined by comparison of the recorded motion with the commanded motion. The results may then be used in the off-line or even real-time compensation of the machine tool. Preferably, the new line of MEMS accelerometers recently introduced is used for instrumenting the machine tool. These MEMS accelerometers have a noise floor that is much lower than traditional piezoelectric accelerometers and are useful in a frequency range from true DC to over 3 kHz.

The noise floor and bandwidth of the accelerometers 20 are significant factors, as the trouble with measuring position using an accelerometer is that the signal must be integrated twice. Each integration amplifies errors present in the acceleration measurements, and, in the past, the noise in the signal has been too great. However, as the technology of accelerometers has improved, and particularly with the advent of micro-machined MEMS accelerometers, the prospect of integrating acceleration to get displacement is feasible. In fact, in one set of previous experiments using gyroscopes, it was observed that gyroscopes were almost accurate enough when integrated to give the machine tool position. If the noise distribution in the accelerometers is Gaussian, then by averaging the signals from many accelerometers, the noise may be greatly reduced. Averaging and using a large number of inexpensive MEMS accelerometers allows for the integration of the acceleration signals to find the position of the spindle with respect to the table 18; that is, with respect to a nominal part at an accuracy that exceeds current industry capabilities.

Two sets of accelerometers 20 is preferred, one set mounted on the table 18 and one set mounted on the spindle, although this configuration should not be construed as limiting. Each set may include multiple accelerometers 20 oriented in the X, Y, and Z machine coordinate directions, and spatially separated within the set. In this manner, it is possible to obtain a measurement of X, Y, and Z motions of the machine 12, as well as rotation about those axes. The accelerometers 20 may be used in real time, while a cutting operation is occurring, to measure and compensate for the machine tool errors. In addition, the same accelerometers may be used for measuring the dynamic stability (i.e. chatter) of the machine 12 during cutting.

Whether errors are measured using the laser trackers 10 or the MEMS accelerometers 20, in sequence or parallel, a method of compensating the machine motions based on these measurements is provided. The laser trackers 10 and the MEMS accelerometers 20 are integrated into an instrumentation computer that is interfaced to the computer numerical controlled (CNC) controller in order to obtain information regarding the nominal positions of the machine 12 for both linear and rotary axes. For new machine tools, this compensation may be made in the existing machine tool controller. For the users of existing machine tools, a stand-alone interface may be utilized.

Figure 2:
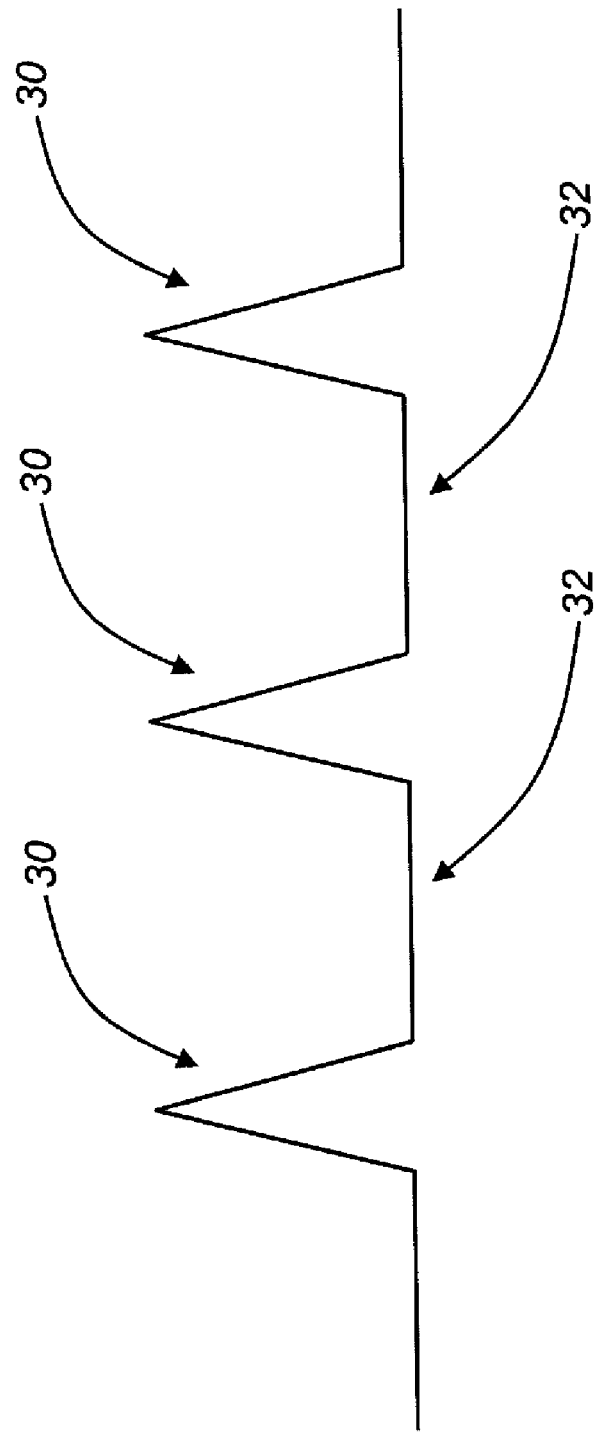
FIG. 2 is a schematic diagram illustrating one exemplary embodiment of a mode of operation of the dynamic metrology system of the present invention, utilizing MEMS accelerometers with occasional "resets" via laser trackers.
Figure 3:
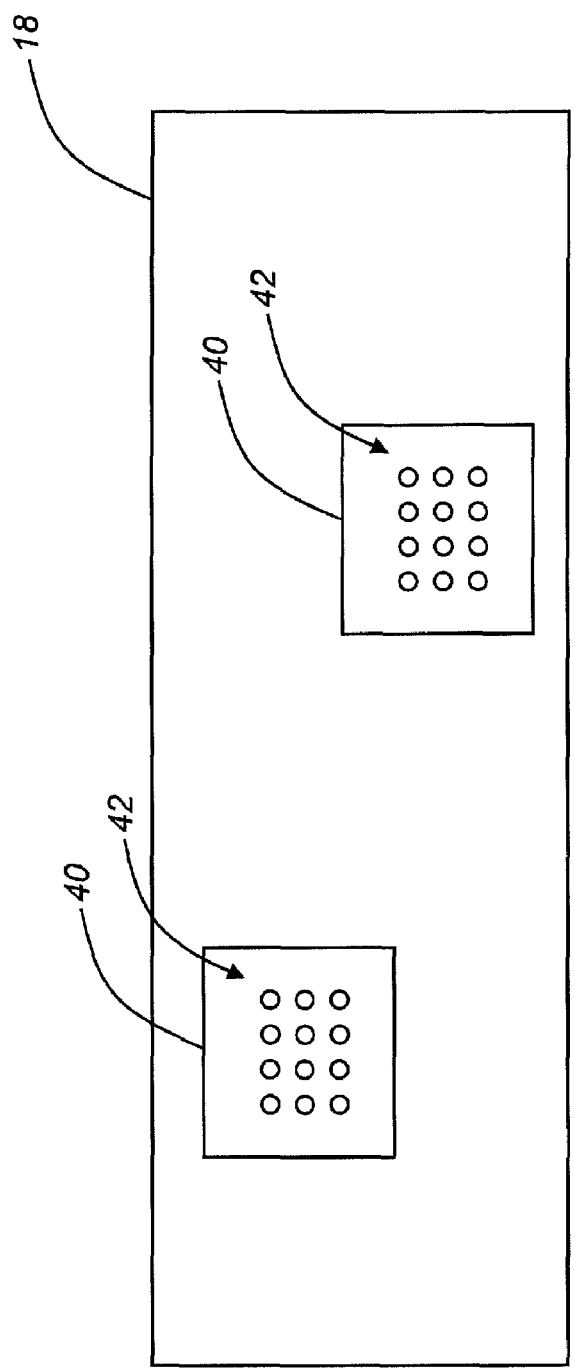
FIG. 3 is a schematic diagram illustrating another exemplary embodiment of a mode of operation of the dynamic metrology system of the present invention, utilizing "virtual fiducials."

The dynamic metrology system 5 (FIG. 1) of the present invention may be utilized in a real-time laser tracker sampling mode of operation, if appropriate lines of sight are available or may be created. FIG. 2, however, is a schematic diagram illustrating one exemplary embodiment of a mode of operation of the dynamic metrology system 5 of the present invention that MEMS accelerometers 20 (FIG. 1) with occasional "resets" via the laser trackers 10 (FIG. 1), again when appropriate lines of sight are available or may be created. Thus, there are periods of laser tracker calibration 30 dispersed within periods of accelerometer operation 32. These periods of laser tracker calibration may be periodic or sporadic, depending upon the application and measuring/manufacturing conditions present. Alternatively, FIG. 3 is a schematic diagram illustrating another exemplary embodiment of a mode of operation of the dynamic metrology system of the present invention, utilizing "virtual fiducials." In this mode of operation, the relativistic position of the machine 12 (FIG. 1) or tool 14 (FIG. 1) is tracked with respect to the workpiece 18 (i.e. its/their "ideal" position) using the MEMS accelerometers 20 (FIG. 1) in given regions 40 of the workpiece 18, i.e. during periods of accelerometer operation 42. Calibration is performed for each of these regions 40 and periods of accelerometer operation 42 using the laser trackers 10 (FIG. 1). Thus, "virtual fiducials" are enabled. This mode of operation is especially suited to complex three-dimensional geometries, if appropriate lines of sight are available or may be created. In this sense, the mode of operation is like a global positioning system (GPS), with the accelerometers 20 representing programmed map segments and the laser trackers 10 representing satellites. Positioning on and movement within the map segments is occasionally calibrated via the satellites, which provide an "actual" position.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A dynamic metrology method, comprising:
periodically determining an actual position of one or more of a machine and a tool with respect to a workpiece using a first device that directly determines position;
tracking a tracked position of the one or more of the machine and the tool with respect to the workpiece using a second device that directly measures a kinematic property other than position, the second device being different from the first device; and
altering a controlled position of the one or more of the machine and the tool with respect to the workpiece when either the actual position or the tracked position of the one or more of the machine and the tool with respect to the workpiece diverges from a desired position of one or more of the machine and the tool with respect to the workpiece;
wherein periods of determining using the first device are dispersed within periods of tracking using the second device.

2. The dynamic metrology method of claim 1, wherein periodically determining the actual position of the one or more of the machine and the tool with respect to the workpiece comprises periodically determining the actual position of the one or more of the machine and the tool with respect to the workpiece using one or more laser interferometers.

3. The dynamic metrology method of claim 2, wherein the one or more laser interferometers are mounted one or more of adjacent to the one or more of the machine and the tool and on the workpiece.

4. The dynamic metrology method of claim 1, wherein tracking the tracked position of the one or more of the machine and the tool with respect to the workpiece comprises tracking the tracked position of the one or more of the machine and the tool with respect to the workpiece using one or more accelerometers.

5. The dynamic metrology method of claim 4, wherein the one or more accelerometers are mounted on one or more of the one or more of the machine and the tool.

6. The dynamic metrology method of claim 1, wherein the actual position of the one or more of the machine and the tool with respect to the workpiece is periodically determined for a region of the workpiece.

7. The dynamic metrology method of claim 6, wherein the tracked position of the one or more of the machine and the tool with respect to the workpiece is tracked within the region of the workpiece.

8. A dynamic metrology system, comprising:
one or more laser interferometers for periodically determining an actual position of one or more of a machine and a tool with respect to a workpiece;
one or more accelerometers for tracking a tracked position of the one or more of the machine and the tool with respect to the workpiece; and
a controller for dispersing periods of determining an actual position within periods of tracking a tracked position and altering a controlled position of the one or more of the machine and the tool with respect to the workpiece when either the actual position or the tracked position of the one or more of the machine and the tool with respect to the workpiece diverges from a desired position of one or more of the machine and the tool with respect to the workpiece.

9. The dynamic metrology system of claim 8, wherein the one or more laser interferometers are mounted one or more of adjacent to the one or more of the machine and the tool and on the workpiece.

10. The dynamic metrology system of claim 8, wherein the one or more accelerometers are mounted on one or more of the one or more of the machine and the tool.

11. The dynamic metrology system of claim 8, wherein the actual position of the one or more of the machine and the tool with respect to the workpiece is periodically determined for a region of the workpiece.

12. The dynamic metrology system of claim 11, wherein the tracked position of the one or more of the machine and the tool with respect to the workpiece is tracked within the region of the workpiece.

13. A component formed by the dynamic metrology method, comprising:
periodically determining an actual position of one or more of a machine and a tool with respect to a workpiece using a first device that directly determines position;
tracking a tracked position of the one or more of the machine and the tool with respect to the workpiece using a second device that directly measures a kinematic property other than position, the second device being different from the first device; and altering a controlled position of the one or more of the machine and the tool with respect to the workpiece when either the actual position or the tracked position of the one or more of the machine and the tool with respect to the workpiece diverges from a desired position of one or more of the machine and the tool with respect to the workpiece;

wherein periods of determining using the first device are dispersed within periods of tracking using the second device.

14. The component of claim 13, wherein periodically determining the actual position of the one or more of the machine and the tool with respect to the workpiece comprises periodically determining the actual position of the one or more of the machine and the tool with respect to the workpiece using one or more laser interferometers.

15. The component of claim 14, wherein the one or more laser interferometers are mounted one or more of adjacent to the one or more of the machine and the tool and on the workpiece.

16. The component of claim 13, wherein tracking the tracked position of the one or more of the machine and the tool with respect to the workpiece comprises tracking the tracked position of the one or more of the machine and the tool with respect to the workpiece using one or more accelerometers.

17. The component of claim 16, wherein the one or more accelerometers are mounted on one or more of the one or more of the machine and the tool.

18. The component of claim 13, wherein the actual position of the one or more of the machine and the tool with respect to the workpiece is periodically determined for a region of the workpiece.

19. The component of claim 18, wherein the tracked position of the one or more of the machine and the tool with respect to the workpiece is tracked within the region of the workpiece.

* * * * *